E. P. HULTIN.
AIR PUMP.
APPLICATION FILED APR. 16, 1917.
1,321,209.
Patented Nov. 11, 1919.
2 SHEETS—SHEET 1.
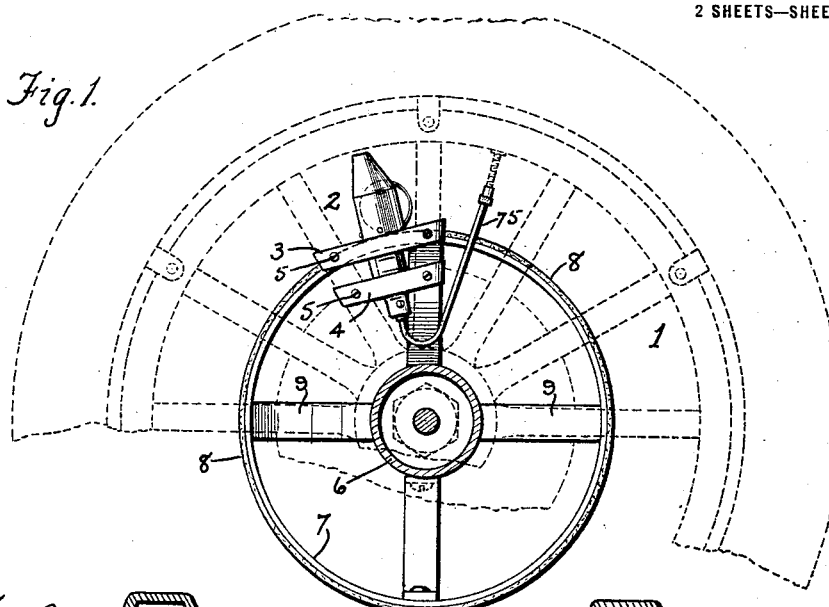
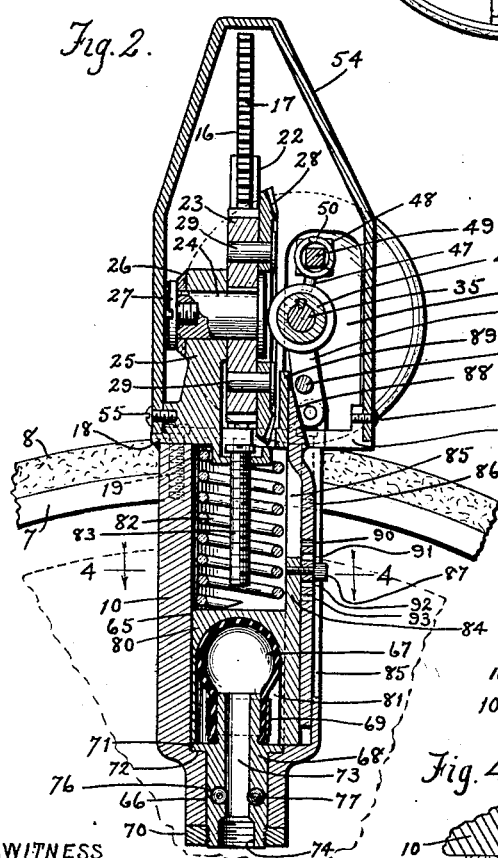
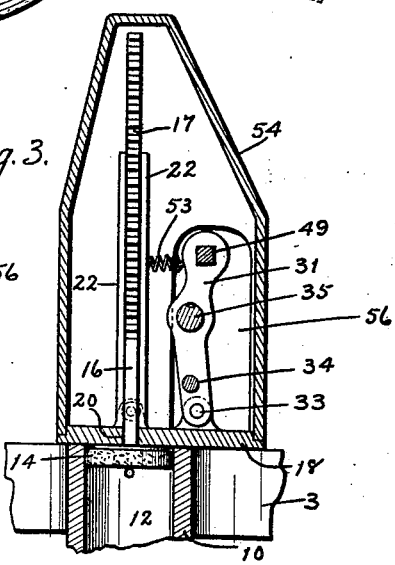
WITNESS
INVENTOR.
Enoch P. Hultin
by Louis C. Vanderlip
Atty.

E. P. HULTIN.
AIR PUMP.
APPLICATION FILED APR. 16, 1917.
1,321,209.
Patented Nov. 11, 1919.
2 SHEETS—SHEET 2.
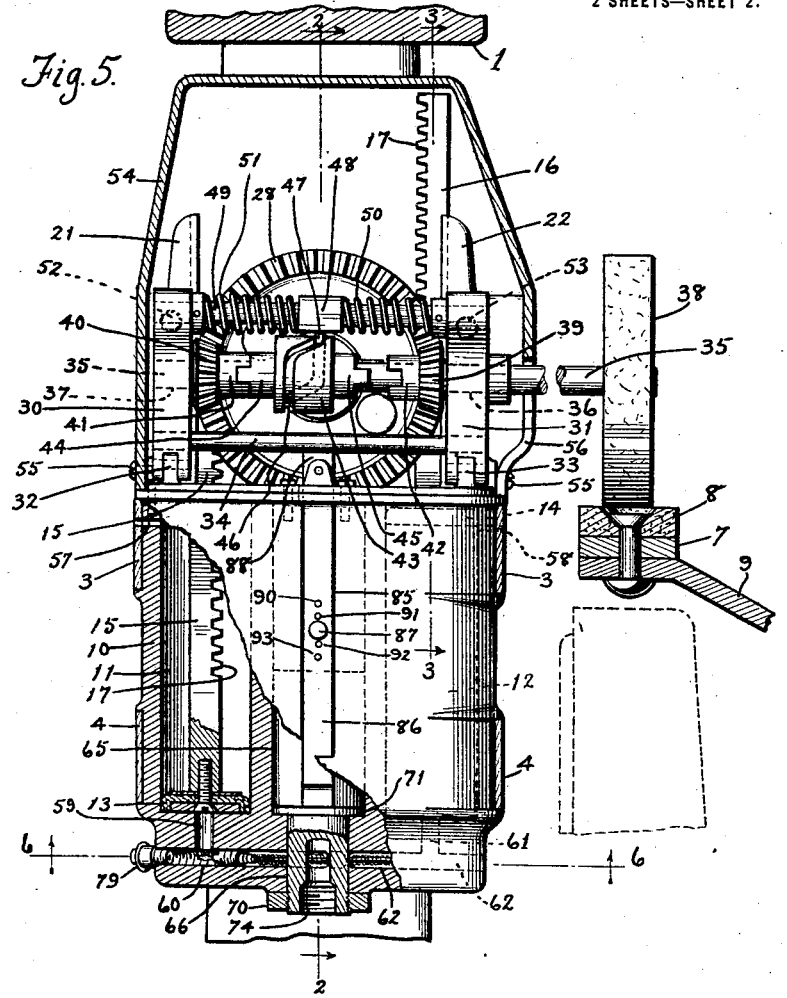
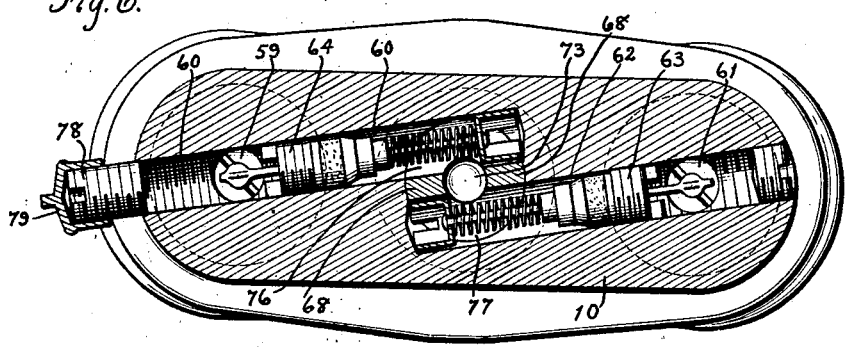
WITNESS.
INVENTOR.
Enoch P. Hultin
by Louis C. Vanderlip
Atty.

UNITED STATES PATENT OFFICE.

ENOCH P. HULTIN, OF ELKHART, INDIANA.

AIR-PUMP.

1,321,209.  Specification of Letters Patent.  Patented Nov. 11, 1919.

Application filed April 16, 1917. Serial No. 162,515.

*To all whom it may concern:*

Be it known that I, ENOCH P. HULTIN, a citizen of the United States, residing at Elkhart, county of Elkhart, and State of Indiana, have invented certain new and useful Improvements in Air-Pumps, of which the following is a specification.

My invention relates to air pumps, and especially to automatically operated and governed air pumps for use with pneumatic tires of motor cars.

An object of my invention is the production of an automatic air pump for maintaining pneumatic tire inflation. Another object of my invention is the incorporation in an automatic air pump for pneumatic tires of adjustment mechanism for regulating the maximum air pressure in the tire. Other objects of my invention will be mentioned and described hereinafter.

The preferred embodiment of my invention is disclosed and well illustrated in the accompanying drawings, in which Figure 1 is a side elevation of an indicated vehicle wheel upon which my invention is mounted; Fig. 2 is a longitudinal view in section through my invention disclosing the governor and a fragment of the fixed driver member; Fig. 3 is a section taken on the line 3—3 of Fig. 5; Fig. 4 is a section taken on the line 4—4 of Fig. 2; Fig. 4ᵃ is a view in section of a modification of the structure disclosed in Fig. 4; Fig. 5 is a view in side elevation showing the driving devices, the driving clutch shifter and the pump base in section; and Fig. 6 is an enlarged section taken on the line 6—6 of Fig. 5.

Similar numerals of reference indicate similar members and parts of members throughout the several views on the drawings.

Referring to the drawings, in detail, the numeral 1 indicates a motor car wheel having a pneumatic tire thereon and upon which is mounted my invention, being here shown fastened to the spokes of the wheel by the metal straps 3 and 4 which are appropriately fastened to the wheel spokes by screws or bolts 5, 5. The numeral 6 indicates a wheel axle housing adapted to carry the annular stationary driver band 7 which is rigidly fastened to said housing 6 by brackets 9, 9 secured thereto in any suitable manner, said driver band having a facing or covering 8 of leather or other suitable material. The numeral 10 indicates a pump body having a plurality of bores 11 and 12 within which the pump pistons 13 and 14 are arranged and adapted to reciprocate, said pistons being suitably fixed to the end of the piston rods 15 and 16, each piston rod having a tooth rack 17 adapted to mesh with a driving gear, as is hereinafter described.

The numeral 18 indicates a pump body cover detachably secured to the pump body 10 by screws 19, 19 and provided with a plurality of piston rod apertures 20, 20 through which the piston rods 15 and 16 pass to the exterior of each piston bore. The numerals 21 and 22 indicate a plurality of opposed and upright piston rod guides of channeled formation within which channels the piston rods are arranged to reciprocally operate. The numeral 23 indicates a piston rod driving spur gear meshing with the rack 17 of both piston rods 15 and 16 and revolubly mounted upon the headed pivot pin 24 which is carried by the bracket 25 upstanding on the cover member 18. The numeral 26 indicates a washer loosely mounted upon the pivot pin 24 and confined thereon by the flat head screw 27 engaging the end of the pin 24.

The numeral 28 indicates a bevel wheel rigidly fastened to the side of the spur wheel 23 by pins 29, 29 and adapted to be driven alternately by two bevel pinions meshing therewith at opposite points, as is hereinafter described. The numerals 30 and 31 indicate spaced frame arms pivotally mounted on the cover 18 at 32 and 33, respectively, and connected with each other by the shifter bar 34. The numeral 35 indicates a drive shaft journaled in the arms 30 and 31 at 36 and 37, respectively, and projecting outward over the driver band 7, the latter being operatively engaged by the driving pulley 38 mounted upon said shaft 35.

The numerals 39 and 40 indicate bevel pinions revolubly mounted upon the drive shaft 35 and meshing with the bevel wheel 28 at opposite points of the toothed periphery thereof. The numerals 41 and 42 indicate tooth clutches carried by the bevel pinions 40 and 39, respectively, and revoluble therewith. The numeral 43 indicates a compound clutch and cam member slidably keyed, or splined, upon the drive shaft 35 and having the tooth clutches 44 and 45, respectively, at opposite ends thereof, said clutches being adapted to alternately engage the bevel pinion clutches 41 and 42, respectively, for alternately rotating the bevel wheel 28, and thereby the spur wheel 23, in opposite directions, whereby the pistons 13 and 14 are alternately reciprocally operated.

The numeral 46 indicates an endless cam slot formed in the outer periphery of the compound member 43, extending circumferentially thereof and composed of two substantially straight slot sections arranged in different transverse planes, and two diagonal slots connecting said straight slots to form one endless cam slot. The numeral 47 indicates a cam slot shifter pin projecting from the cam pin carrier 48, said pin being arranged within the cam slot 46 and adapted to follow it during the revolution of the compound member 43. The numeral 49 indicates a carrier bar supported by the members 30 and 31 and substantially parallel with the drive shaft 35, the cam pin carrier being slidably but non revolubly mounted thereon and poised yieldably thereon between the coil springs 50 and 51 which bear against it from either side thereof. It is obvious that the function of the cam slot pin 47 is to effect the control and shift of the compound clutch member 43, the shift thereof being effected by the diagonal slot section of the slot 46 and the shift maintenance by the straight slot section. It is also evident that the springs 50 and 51 effect a yieldable engagement of the compound clutch member 43 with its companion clutches carried by the bevel pinions 39 and 40.

The numerals 52 and 53 indicate a plurality of springs anchored to the members 21 and 22, respectively, and fastened to the members 30 and 31, which springs normally confine the bevel pinions 39 and 40 in mesh with the bevel wheel 28 and which, when said bevel pinions are projected out of mesh with said bevel wheel as is hereinafter described, are adapted to retract said pinions into reengagement with said bevel wheel. From the foregoing it is evident that the members 30, 31, 34 and 49, when rigidly assembled and hinged at 32 and 33, respectively, constitute a swinging, or oscillatory, frame upon which the driving and clutch shifting mechanism and devices are carried, said frame, with its pump driving mechanism, being adapted to be swung away from the bevel wheel 28 for disengaging the bevel pinions 39 and 40 therefrom, by means hereinafter described.

The numeral 54 indicates a casing for the driving mechanism and fastened detachably to the cover 18 by screws 55, 55, said casing being suitably apertured at 56 to admit the driving shaft 35. The numerals 57 and 58 indicate air intake ports in communication with the pump bores 11 and 12, respectively, and adapted to be uncovered, or overrun, by the pump pistons 13 and 14. The numeral 59 indicates an air discharge port for the pump bore 11 and communicating with the transverse air passage 60, and numeral 61 indicates an air discharge port placing pump bore 12 in communication with the transverse air passage 62. The numerals 63 and 64 indicate compound check valve members of conventional structure arranged within the transverse air passages 62 and 60, respectively, and adapted to admit air therethrough from pump cylinders 11 and 12 but to check the return thereof. The numeral 65 indicates the pump governor cylinder disposed within the pump barrel member 10 and having its upper end closed by the cover 18, the lower end whereof is provided with a reduced opening 66. The numeral 67 indicates an expansible governor bulb, preferably made of substantially pure rubber, which is mounted upon the reduced end of a bulb carrier 68 and secured thereto by a clip 69, or in any other suitable manner, said carrier being arranged within the aperture 66 and secured rigidly therein by the nut 70 which is screw threaded upon the lower end of the member 68. The numeral 71 indicates an annular flange on the carrier 68 and adapted to form a seal on the shoulder 72, being drawn tightly against said shoulder by the nut 70. The numeral 73 indicates a longitudinal air passage in the carrier member 68, in communication with the interior of the bulb 67 and screw threaded at 74 to receive the screw connection of the valveless air hose or conduit 75 leading to the inner tube or air container of the pneumatic tire.

The numerals 76 and 77 indicate a plurality of transverse passages formed in the carrier 68 on opposite sides of and in communication with the air passage 73 and adapted to place said air passage in communication with the air passages 60 and 62 to admit air to the conduit 75 for tire inflation. The numeral 78 indicates a nipple screw threaded into the outer end of the air passage 60 and adapted to receive the discharge end of a hand air pump connection for tire inflation if the pump herein described should be inoperative by breakage, or otherwise. The numeral 79 indicates a cap screw threaded upon the nipple 78 for closing the end thereof.

The numeral 80 indicates a governor piston slidably disposed within the governor cylinder 65 and provided with the governor bulb chamber 81 within which the bulb 67 is arranged, said piston being normally seated upon the flange 71 of member 68 by virtue of the exertion of the coil spring 82 disposed within the cylinder 65 and bearing against the end periphery of said piston. The tension of the spring 82 is such that the piston 80 is confined upon its seat thereby under low and normal air pressures within the tire, but any pressure in excess of normal, or predetermined, pressure will expand the bulb 67 and actuate the piston 80 off its seat. The numeral 83 indicates a governor piston stop member screw threaded into the cover 18 and adjustable longitudinally of the cylinder 65 for limiting the upward travel of the piston 80 to any predetermined limit. The numeral 84 indicates a bracket carried by the piston 80 and extending longitudinally thereof, said bracket projecting laterally from said piston body for slidable disposition within the upright slot 85 formed in the wall of the cylinder 65 and in communication therewith.

The numeral 86 indicates an upright governor arm projecting from and rigidly fastened to the piston bracket 84, being fastened thereto by a screw 87, said arm end having a flat sloping face 88 which is outwardly disposed and arranged adjacent to and adapted to engage the frame shifter bar 34 when upwardly actuated by the movement of the governor piston 80. When so actuated the arm face 88 swings the members 30 and 31 of the driving mechanism frame outwardly, thereby taking the bevel pinions 39 and 40 out of mesh with the bevel wheel 28, whereby the pump pistons 13 and 14 cease to operate. The numeral 89 indicates an abutment member carried by the cover 18 and adapted to be engaged by the inner periphery of the arm 86 to prevent deflection thereof when the face 88 is engaging the bar 34.

The numerals 90, 91, 92 and 93 indicate screw apertures formed in member 86 which are adapted to receive the screw 87, whereby vertical adjustment of the arm 86 may be made for timing the engagement of the bar 34 by the arm face 88 and thereby effecting a variable maximum air pressure in the pneumatic tire. At Fig. 4ª the numeral 94 indicates a cover slidably mounted between the guide strips 95 and 96 fastened to the pump body 10 in any suitable manner, said cover being adapted to exclude mud and injurious matter from the governor arm 86 and the slot 85.

In operation, the interior of the governor bulb 67 is in permanent communication with the interior of the pneumatic tire through the passage 73 and the air tube 75, and, therefore it is always inflated when the tire itself is inflated. When the vehicle wheel rotates the driving pulley 38 is rotated by contact with the band facing 8 around which it moves, thereby rotating the driving shaft 35 and the compound clutch member 43 splined thereto. The engagement of the shifter pin 47 with the cam slot 46 causes the member 43 to be shifted back and forth on the shaft 35 into yieldable alternate clutch engagement with the gear clutches 41 and 42, whereby the bevel wheel 28, and thereby spur wheel 23, is alternately rotated in opposite directions, thereby alternately reciprocating the pump pistons 13 and 14.

As the air pressure in the pneumatic tire increases the bulb 67 is distended, or expanded, forcing the piston 80 upward off its seat and against the coil spring 82, thereby projecting the arm face 88 into engagement with the transverse shifter bar 34 of the driving mechanism frame, whereby the entire driving mechanism frame which is hinged at 32 and 33 is swung away from the bevel wheel 28 and the bevel pinions 39 and 40 projected out of mesh therewith. Until the air pressure within the tire diminishes the bevel pinions 39 and 40 are held out of mesh with the bevel wheel 28; but as the pressure is lowered or diminishes, for any reason, the spring 82 forces the piston 80 downward, retracting the arm face 88 from the bar 34, and positioning the piston 80 again upon its seat on the flange 71 of member 68. Thereupon, the springs 52 and 53 swing the driving mechanism frame forward and again mesh the pinions 39 and 40 with the bevel wheel 28 which again function as hereinbefore described.

As heretofore stated, the apertures 90, 91, 92 and 93 formed in the governor arm 86 are adapted to enable the upward and downward adjustment of said arm for regulating and controlling the air pressure in the tire. If a high pressure is desired the arm 86 is secured to the piston bracket 84 by either of the apertures 90 and 91 and the screw 87 being accompanied by a corresponding adjustment of the screw 83 in the opposite direction. That is to say, the arm 86 is downwardly adjusted and the screw 83 upwardly adjusted to gain a relatively high air pressure. To effect a lower tire air pressure the arm 86 is upwardly adjusted through either of the screw apertures 92 and 93 accompanied by a corresponding downward adjustment of the screw 83. In either case the adjustment of the screw 83 limits the upward travel of the governor piston 80. And the adjustment of the arm 86 causes an early or late engagement of the bar 34 by the arm face 88 according to the direction of adjustment thereof. Obviously an upward adjustment of the arm 86 effects an early engagement of the bar 34, and a late engagement of said bar is effected by a downward adjustment thereof.

I claim:

1. In combination, a wheel; a pneumatic tire on said wheel; an air pump; means for driving said pump, said driving means being mounted upon a spring retracted oscillatory frame which is adapted to disengage the pump driving mechanism when said frame is oscillated; a pump governor cylinder; a governor piston movable in said cylinder; a hollow expansible governor bulb engaging said piston, connected with the fluid pressure in the tire and adapted to move said piston when pneumatically expanded in excess of a predetermined pressure; an arm operatively connected with said piston and disposed adjacent said driving mechanism frame whereby said frame is oscillated when said governor piston is actuated by the expansion of the governor bulb; and means for retracting said governor piston when the fluid pressure in the tire is reduced.

2. In combination, a wheel; a pneumatic tire on said wheel; an air pump; mechanism for driving said pump, said mechanism being mounted upon a spring controlled oscillatory frame which is adapted to disengage the pump driving mechanism when said frame is oscillated; a pump governor cylinder; a governor piston movable in said cylinder; a hollow expansible governor bulb engaging said piston, connected with the fluid pressure in said tire and adapted to move said piston when pneumatically expanded in excess of a predetermined pressure; an arm operatively connected with said piston and disposed adjacent said driving mechanism frame whereby said frame is oscillated when said governor piston is actuated by the expansion of said governor bulb; a stop member for limiting the piston movement; and means for retracting said governor piston when the fluid pressure in the tire is reduced.

3. In combination, a wheel; a pneumatic tire on the wheel; an air pump; mechanism for driving said pump, said mechanism being mounted upon an oscillatory frame which is adapted to disengage the pump driving mechanism when said frame is oscillated; a pump governor cylinder; a movable governor piston in said cylinder; a hollow expansible governor bulb within said cylinder, connected with the fluid pressure in the tire and adapted to actuate said piston when pneumatically expanded in excess of a predetermined pressure; an arm adjustably and operatively connected with said piston, one end of said arm being disposed adjacent said driving mechanism frame whereby said frame is moved when said piston is actuated; a stop member adjustably mounted in said cylinder and adapted to limit the piston movement; means for retracting said governor piston when the fluid pressure in the tire is reduced; and means for restoring the pump driving mechanism frame to its normal pump driving position when said frame has been relieved of the exertion of said piston arm.

4. In a device of the class described, a wheel; a pair of air pump cylinders mounted upon the wheel; pistons operative in said pump cylinders, each piston having a piston rod provided with a rack; a revoluble gear meshing with both piston rod racks; a bevel gear operatively connected with said first mentioned gear; a driving shaft; means for rotating said shaft; a pair of compound bevel pinion clutches revolubly mounted upon said driving shaft, said bevel pinions meshing with said bevel gear at substantially diametrically opposite points; a double clutch member splined upon said driving shaft and positioned intermediate said compound bevel pinion clutches; and means actuated by the rotation of said driving shaft for shifting said double clutch and alternately engaging it with the bevel pinion clutches, whereby said pistons are alternately reciprocated.

5. In a device of the class described, a wheel; a pair of air pump cylinders mounted upon the wheel; pistons operative in said pump cylinders, each piston having a piston rod which is provided with a rack; a revoluble gear meshing with both piston rod racks; a bevel gear operatively connected with said first mentioned gear; a driving shaft; means for rotating said shaft; a pair of compound bevel pinion clutches revolubly mounted upon said driving shaft, said bevel pinions meshing with said bevel gear at substantially diametrically opposite positions; a double clutch member splined to said shaft and positioned intermediate said compound bevel pinion clutches; and means actuated by the rotation of said driving shaft for yieldably shifting said double clutch and alternately engaging it with the bevel pinion clutches, whereby said pistons are alternately reciprocated.

6. In a device of the class described, a wheel; a pneumatic tire upon said wheel; a pair of air pump cylinders mounted upon said wheel and adapted to supply air to said tire; pistons operative in said pump cylinders, each piston having a piston rod provided with a rack; a revoluble gear meshing with both piston rod racks; a bevel gear operatively connected with said first mentioned gear; a driving shaft mounted upon a movable frame, said frame being adapted to be moved toward and away from said bevel gear; means for rotating said driving shaft; a pair of compound bevel pinion clutches revolubly mounted upon said driving shaft, normally meshing with said bevel gear and adapted to be moved into and out of mesh with said bevel gear in synchronism with the driving shaft frame movement; a double clutch member splined to said driving shaft and positioned intermediate said bevel pinion clutches; means actuated by the rotation of said driving shaft for shifting said double clutch and alternately engaging it with the bevel pinion clutches, whereby said air pump pistons are alternately reciprocated; means actuated by the air pressure in the tire for moving said shaft driving frame, whereby said bevel pinions and said bevel gear are thrown out of mesh; and means for retracting said frame and thereby restoring the mesh of said bevel pinions with said bevel gear after said frame is relieved of the exertion of the air pressure of said tire.

7. In a device of the class described, a wheel; a pair of air pump cylinders mounted upon the wheel; pistons operative in said pump cylinders, each piston having a piston rod which is provided with a rack; a revoluble gear meshing with both piston rod racks; a bevel gear operatively connected with said first mentioned gear; a driving shaft; means for rotating said shaft; a pair of compound bevel pinion clutches revolubly mounted upon said driving shaft, said pinions meshing with said bevel gear at substantially diametrically opposite positions; a double clutch member splined upon said driving shaft and positioned intermediate said compound bevel pinion clutches; a shifter member mounted adjacent said double clutch; complementary pin and cam slot connection between said double clutch and said shifter for shifting the latter for alternately engaging said double clutch with said bevel pinion clutches, whereby said air pump pistons are alternately operated.

8. In a device of the class described, a wheel; a pair of air pump cylinders mounted upon the wheel; pistons operative in said pump cylinders, each piston having a piston rod which is provided with a rack; a revoluble gear meshing with both piston rod racks; a bevel gear rigidly mounted upon said first mentioned gear; a driving shaft; means for rotating said driving shaft; a pair of compound bevel pinion clutches revolubly mounted upon said driving shaft, said pinions meshing with said bevel gear at substantially diametrically opposite positions: a double clutch member splined upon said driving shaft and positioned intermediate said bevel pinion clutches; a shifter member yieldably mounted adjacent said double clutch; and complementary pin and cam slot connection between said double clutch and said shifter for shifting the latter for alternately engaging said double clutch with said bevel pinion clutches, whereby said air pump pistons are alternately operated.

In testimony whereof I have hereunto affixed my signature at Elkhart, Indiana, this 12th day of April, 1917.

ENOCH P. HULTIN.

Copies of this patent may be obtained for five cents each, by addressing the "Commissioner of Patents, Washington, D. C."